UNITED STATES PATENT OFFICE 2,343,429

FILTER

Donald H. Wells, Maplewood, N. J., and Melvin De Groote, University City, Mo., assignors to Purolator Products, Inc., Newark, N. J., a corporation of Delaware No Drawing. Application February 28, 1941, Serial No. 381,120

12 Claims. (Cl. 252—326)

This invention relates to filtration and filters therefor and relates more particularly to filtration of lubricating oil of an internal combustion engine for the removal of solids therefrom.

The lubricating oil of an internal combustion engine, particularly a Diesel type engine, contains minute solids which filtering media, such as cloth, paper, cotton linters, wood pulp and the like, require considerable time to remove. The dirt removal rate of such filtering media depends upon a number of different conditions such as, in depth type filters, the method of assembling the medium, the density of the packing of the medium, the distribution of the oil passing therethrough, temperature, pressure and a number of other variables. In filters of the extended area type, the amount of surface area, temperature, viscosity of the oil and other factors affect the dirt removal rate.

An object of this invention is to increase sharply the dirt removal rate of filtering media of the types above mentioned.

We have found that in filtering lubricating oil of internal combustion engines the dirt removal rate of a filtering medium may be sharply increased by contacting oil in the lubricating system of the engine that is filtered by the filtering medium with a drastically oxidized ricinoleic body. For example, the drastically oxidized ricinoleic body may be, and preferably is, drastically oxidized castor oil. The drastically oxidized ricinoleic body may be added to the filtering medium in order to increase the dirt removal rate of the filtering medium or may be contacted in some other way with the oil in the system that passes through the filtering medium. Preferably the drastically oxidized ricinoleic body is used according to this invention by including it in a filter for use in the lubricating system of an internal combustion engine so as to provide an improved filter having high dirt removal rate.

The most readily available drastically oxidized ricinoleic body is drastically oxidized castor oil, and drastically oxidized castor oil is a preferred material that may be used to increase the dirt removal rate of filtering media in the practice of this invention. Other ricinoleic bodies which, when drastically oxidized, may be used to increase the dirt removal rate of filtering media include such substances as monoricinolein, diricinolein, ricinoleic acid, polyricinoleic acids, etc.

Ricinoleic bodies of the character referred to can be produced in a drastically oxidized condition by subjecting them to such conditions that they become very highly oxidized. This is usually accomplished by subjecting a ricinoleic body to treatment, such as, blowing with a suitable gaseous oxidizing medium, e. g., air, oxygen, ozone, or ozonized air. Such oxidation is commonly carried out at ordinary or super-atmospheric pressure (up to about 200 pounds per square inch) either moist or dry; and in the presence or absence of a catalyst, such as lead oleate, cobalt linoleate, or manganese oleate, or such as, alpha pinene or linseed oil, etc. Care should be taken, however, not to permit temperature rise such that excessive pyrolytic decomposition would take place. The oxidation may be vigorous as by vigorous blowing, or may be more gradual as by exposure in thin films to air provided the oxidation is sufficiently prolonged to obtain the desired drastic oxidation. Usually the time required is at least about 8 to 10 hours under conditions most favorable to oxidation, e. g., blowing at a relatively high temperature, and for certain fatty bodies much more prolonged oxidation, e. g., several days or even weeks is desirable, especially under conditions less favorable to rapid oxidation. In any event, whether the oxidation is produced by continued mild oxidation or by more vigorous oxidation, a condition of drastic oxidation is indicated by changes in chemical and physical attributes of the material. These changes are usually indicated by a lowered iodine value, an increased saponification value, usually an increased acetyl value, an increased specific gravity, and an increased refractive index. Thus, the iodine number may become less than 70 and even as low as about 40. The saponification value may be about 215 to about 283 and the acetyl value may be about 160 to about 200. The viscosity is increased and the drastically oxidized product may become very heavy and stiff at ordinary temperatures. The refractive index is also increased. The color of the drastically oxidized material may be a pale yellow or light amber or may be a deep orange color. If oxidation is carried on long enough a product of liver-like consistency and dark color is obtained, but since such material is more difficult to utilize as an agent to increase the dirt removal rate of filtering media those drastically oxidized ricinoleic bodies which are pale blown and have some fluidity at normal temperatures are preferred.

Drastically oxidized castor oil suitable for use in increasing the dirt removal rate of filtering media may, if desired, be obtained in the open market and are commonly sold under such names as "blown castor oil," "processed castor oil," "oxidized castor oil," "heavy castor oil," etc., which, while they may differ slightly from each other, are nevertheless drastically oxidized and suitable for use in the practice of this invention.

The ricinoleic body that is brought to a drastically oxidized condition may be an oil, such as castor oil, or may be in the form of an acid, such as ricinoleic acid, or a diricinoleic acid or some other castor oil fatty acid. Moreover, the ricinoleic body, e. g., a castor oil fatty acid, may be polymerized either before or after the oxidation step. Therefore, reference to a drastically oxidized ricinoleic body includes drastically oxidized ricinoleic bodies that may be either polymerized or unpolymerized. When the polymerization occurs after the oxidation step this can be caused by continuing to heat the oxidized oil after the oxidation has been completed and at a temperature that may be even somewhat higher than the temperature maintained during oxidation.

The drastically oxidized ricinoleic body may, if desired, be saponified by an alkali, such as sodium hydroxide, potassium hydroxide, ammonia, or by an amine, such as diethanolamine, triamylamine, morpholine, etc. Moreover, if the drastically oxidzed ricinoleic body contains any residual acidity it may be esterified to form an ester product as by reaction with some alphatic alcohol, such as methyl, ethyl or propyl alcohol, or with some hydroxylated amine acting as an alcohol.

By way of example, a preferred drastically oxidized ricinoleic body for use in increasing the dirt removal rate of a filtering medium according to this invention is drastically oxidized castor oil which is pale blown. We prefer to employ a pale blown castor oil having the following characteristics:

| | |
|---|---|
| Acid number | 15.1 to 25.0 |
| Saponification number | 230.5 to 274.0 |
| Iodine number | 43.5 to 55.0 |
| Acetyl number | 164.0 to 192.0 |
| Hydroxyl number | 188.0 to 220.0 |
| Percent. unsaponifiable matter | 1.1 |
| Percent. nitrogen | .0 |
| Percent. SO₂ | .0 |
| Percent. ash | Trace |

The drastically oxidized castor oil or other drastically oxidized ricinoleic body when used in conjunction with a filter sharply increases the dirt removal rate of the filter. The material may be used in a number of different ways. Thus, in a paper type filter the product, either by itself or mixed with a solvent such as alcohol, preferably is applied to the surface of the paper covering all or a portion of the total paper surface exposed to oil. Cloth filters may be similarly treated. Cotton linters filters preferably are treated by adding the product either diluted or undiluted to the cotton linters either on the surface or throughout the body thereof. Other filtering mediums sufficiently porous to permit oil to flow therethrough but sufficiently compact to filter out solid particles may be similarly treated. The product is also effective when incorporated in the filter or filter medium in other ways than those above mentioned. Moreover, whenever the product is permitted to contact oil that passes through a filtering medium it is effective to increase the rate of dirt removal of the filtering medium. Thus, if the product is applied to a screen or the like, through or past which the oil flows before reaching the filtering medium, the dirt removal rate of the filtering medium is increased. If the material is merely introduced into the casing within which the filtering medium is contained, it is effective.

The amount of the product that is used depends upon the increase in dirt removal rate that is desired. Ordinarily, for commercial purposes a small amount, such as about 2 to 25 grams, is all that is desirable for use in connection with a filter of proper size for the average automobile. Use of as little as 4 grams gives a very pronounced increase in dirt removal rate and the dirt removal rate is only slightly increased by using 5 or 6 times this amount.

As above mentioned, the use of an additive of the type above defined sharply increases the dirt removal rate. In other words, when a filtering operation is carried on using these additives in connection with a filter, a single filter can remove dirt as fast as the dirt could be removed by the use of a plurality of untreated filters. In thus increasing the dirt removal rate, the improved result is secured chiefly through a greater removal of solids in a single passage through the filtering medium.

The improvements in the rate of dirt removal from lubrication oil that may be effected by the additives herein defined, have been tested by the following procedure. From a heated tank containing six quarts of oil, oil was withdrawn by a pump and forced continuously at 45 pounds per square inch pressure into a standard type automobile filter and the filtered oil was returned to the tank. Starting with clean oil, 5 grams of solids of the type formed in automobiles were added to the oil in the tank in such manner as to be thoroughly distributed throughout the oil in the tank, and observation was made of this oil to determine the number of minutes required to clean it to .02% solid content after each addition of the dirt. At two-hour intervals, additional 5-gram dirt charges were added and observations made of the length of time required to clean the oil in the tank to .02% solids after each dirt addition. Comparative tests were run with two sets of similar filters, the filters of one set being treated with the additive and the filters of the other set not being so treated. After each filter had reached the condition where oil in the tank contained .1% solids two hours after the dirt was added, the amount of dirt in the filter was determined by subtracting the amount of dirt remaining in the tank from the amount of dirt added during the test. The results for each set of filters were averaged. Using ester products above described, it was found that the treated filter cleaned up the first addition of dirt much more rapidly than with the untreated filter and with subsequent dirt additions, the advantage in favor of the treated filter persisted. The life of the treated filter was not materially greater than that of the untreated filter.

According to this invention, additives that sharply increase the dirt removal rate of filtering media are made available which retain their effectiveness for the full life of the filter, withstand the temperatures encountered in internal combustion engine lubrication without volatilization, remain absorbed or deposited on the filtering medium during its use, and impart no injurious effects to the oil being filtered. The additive may be used without requiring any material change in the manufacture of the filter. Because of the faster dirt removal rate resulting from the use of the additive, the treated filter reduces the accumulation of solid particles and abrasive matter in the lubricant materially below that obtainable by a similar filter that has not been treated and thereby enhances the efficacy of the lubricant.

While this invention has been described in connection with a number of examples of products suitable for use in increasing the dirt removal rate of filtering media according to this invention, it is to be understood that this has been done merely for the purpose of illustration and exemplification and that the scope of this invention is to be governed by the language of the following claims considered in the light of the foregoing description.

We claim:

1. A filter for use in connection with the lubricating system of an internal combustion engine, said filter comprising a casing containing a filtering medium which is sufficiently porous to permit oil to flow therethrough but sufficiently compact to filter out solid particles, and said filter comprising for contact with oil passing therethrough an agent for increasing the dirt removal rate of said filtering medium, said agent comprising a drastically oxidized ricinoleic body.

2. A filter according to claim 1 wherein said drastically oxidized ricinoleic body is drastically oxidized castor oil.

3. A filter according to claim 1 wherein said drastically oxidized ricinoleic body is drastically oxidized castor oil fatty acid.

4. A filter according to claim 1 wherein said drastically oxidized ricinoleic body is drastically oxidized castor oil that has been pale blown and that has an iodine number less than 70, a saponification value of about 215 to 233 and an acetyl value of about 160 to 200.

5. A filter according to claim 1 wherein said drastically oxidized ricinoleic body is drastically oxidized castor oil that has been pale blown and that has the following characteristics

| | |
|---|---|
| Acid number | 15.1 to 25.0 |
| Saponification number | 230.5 to 274.0 |
| Iodine number | 43.5 to 55.0 |
| Acetyl number | 164.0 to 192.0 |
| Hydroxyl number | 188.0 to 220.0 | and substantial freedom from unsaponifiable matter, nitrogen, $SO_2$ and ash.

6. A filter for use in connection with the lubricating system of an internal combustion engine comprising a casing containing a filtering medium sufficiently porous to permit oil to flow therethrough but sufficiently compact to filter out solid particles, said medium having applied thereto as an agent to increase the dirt removal rate of said filtering medium a drastically oxidized ricinoleic body.

7. A filter according to claim 6 wherein said drastically oxidized ricinoleic body is drastically oxidized castor oil.

8. A method of increasing the dirt removal rate of a filtering medium arranged in the lubricating system of an internal combustion engine for removing dirt from the lubricating oil in said system, said method comprising contacting oil in the system that is filtered by said filtering medium with a drastically oxidized ricinoleic body.

9. A method according to claim 8 wherein said drastically oxidized ricinoleic body is drastically oxidized castor oil.

10. A method according to claim 8 wherein said drastically oxidized ricinoleic body is drastically oxidized castor oil fatty acid.

11. A method according to claim 8 wherein said drastically oxidized ricinoleic body is drastically oxidized castor oil that has been pale blown and that has an iodine number less than 70, a saponification value of about 215 to 283 and an acetyl value of about 160 to 200.

12. A method according to claim 8 wherein said drastically oxidized ricinoleic body is drastically oxidized castor oil that has been pale blown and that has the following characteristics:

| | |
|---|---|
| Acid number | 15.1 to 25.0 |
| Saponification number | 230.5 to 274.0 |
| Iodine number | 43.5 to 55.0 |
| Acetyl number | 164.0 to 192.0 |
| Hydroxyl number | 188.0 to 220.0 | and substantial freedom from unsaponifiable matter, nitrogen, $SO_2$ and ash.

DONALD H. WELLS.
MELVIN DE GROOTE.